United States Patent [19]
Maier et al.

[11] 4,140,536
[45] Feb. 20, 1979

[54] GYPSUM PRODUCTS

[75] Inventors: Simbert W. Maier, Boksburg; Adriaan J. H. Lamprecht, Alberton, both of South Africa

[73] Assignee: Gypsum Industries Limited, Germiston, South Africa

[21] Appl. No.: 882,948

[22] Filed: Mar. 1, 1978

[30] Foreign Application Priority Data

Apr. 29, 1977 [ZA] South Africa .................. 77/2579

[51] Int. Cl.² ........................................... C04B 11/14
[52] U.S. Cl. .................................................. 106/116
[58] Field of Search ........................................ 106/116

[56] References Cited

U.S. PATENT DOCUMENTS

| | | | |
|---|---|---|---|
| 2,432,963 | 12/1947 | Camp | 106/116 |
| 2,483,806 | 10/1949 | Buckley | 106/116 |
| 2,526,537 | 10/1950 | Camp | 106/116 |
| 2,526,538 | 10/1950 | Camp | 106/116 |
| 3,935,021 | 1/1976 | Greve | 106/116 |
| 4,042,409 | 8/1977 | Terada | 106/116 |

*Primary Examiner*—James Poer
*Attorney, Agent, or Firm*—Cushman, Darby & Cushman

[57] ABSTRACT

This invention relates to a method of making a gypsum product wherein a hot homogeneous mixture of pitch and a suitable organic material are mixed with gypsum and water to form a slurry. This slurry is then formed, allowed to set and then heated to a temperature above the melting points of both constituents of the mixture but below the temperature at which there is any significant deterioration of the product.

14 Claims, 2 Drawing Figures

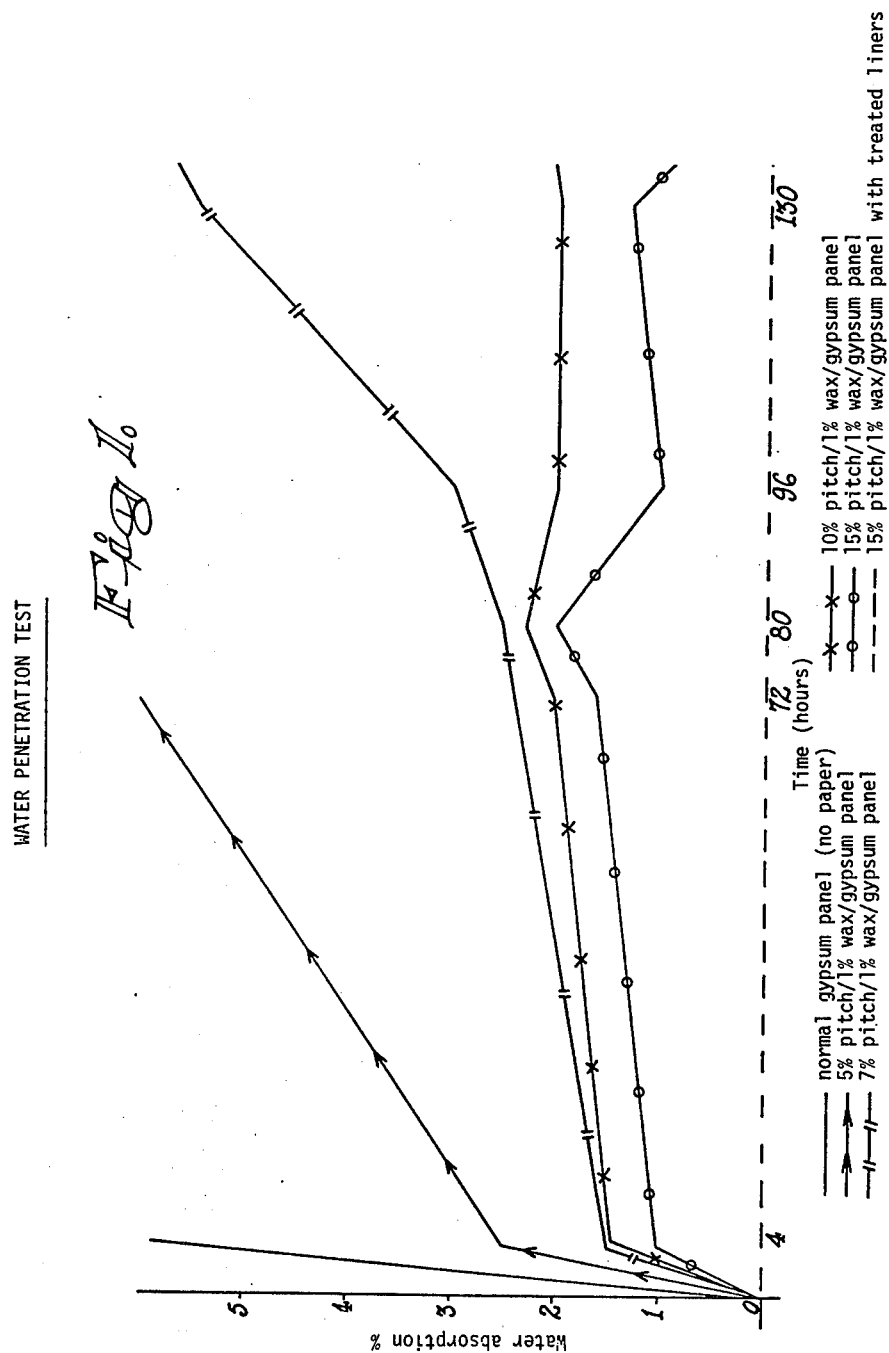

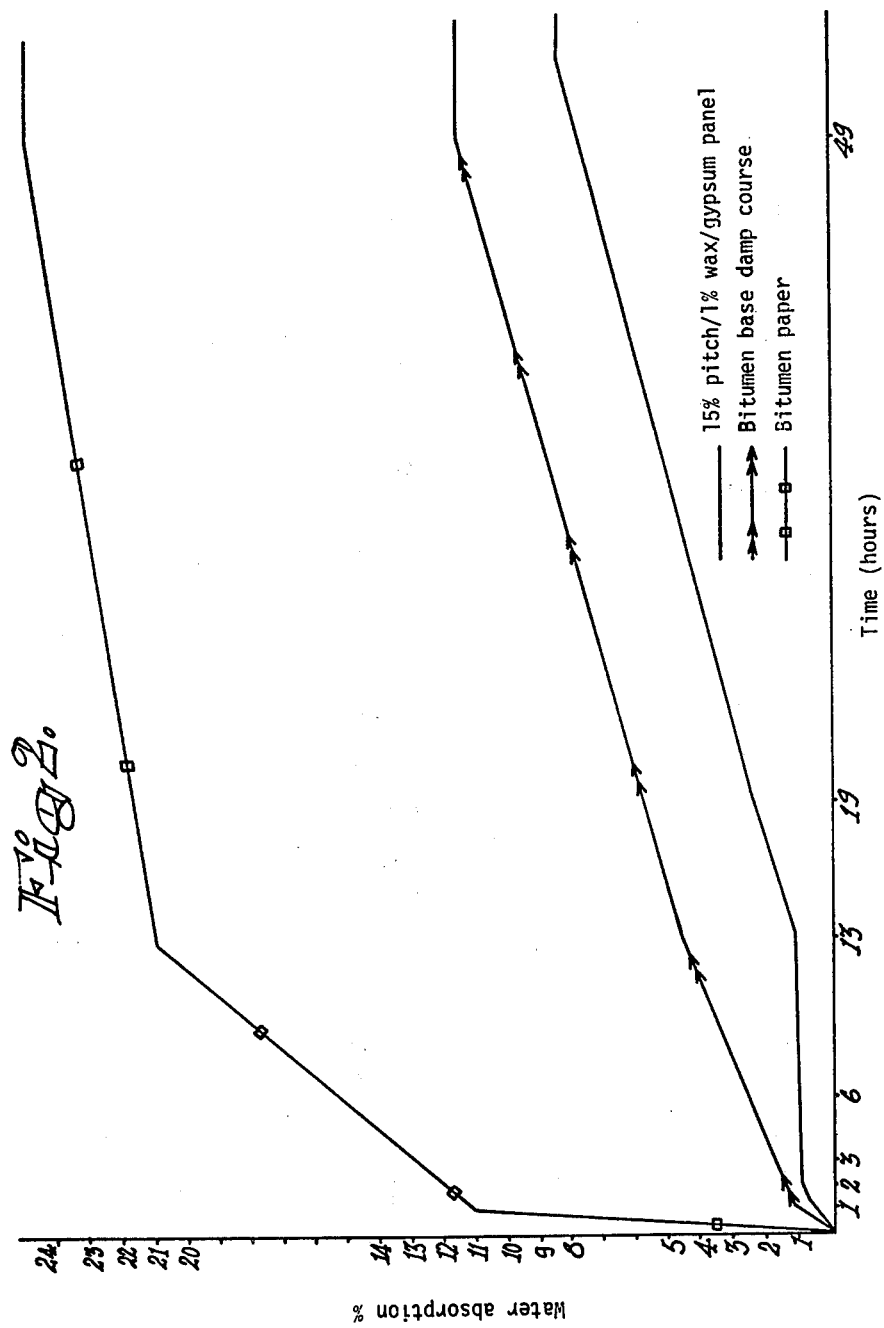

GYPSUM PRODUCTS

BACKGROUND OF THE INVENTION

This invention relates to products including gypsum as a major constituent and more particularly to a method of producing these products so that they are resistant to damage by water.

Normally gypsum products, for example boards for walls and the like, are manufactured in the following way: gypsum in the hemi-hydrate form is admixed with a predetermined quantity of water (known as the "water demand") to form a slurry of required consistency. To produce a board the slurry is fed between paper liners and formed into the correct shape in a mould. The setting process which is exothermic in nature then takes place and results in the hard gypsum product.

Attempts to waterproof the products have included the addition of bitumen/wax emulsion to the slurry. This has not proved very satisfactory, probably because the emulsifying agents effect the setting time of the gypsum slurry and the conversion of the gypsum hemi-hydrate to the di-hydrate.

An object of this invention is to provide an improved waterproofing method for gypsum products.

DETAILED DESCRIPTION OF THE INVENTION

According to the invention a method of making gypsum products comprises the steps of:

making at elevated temperatures a homogeneous liquid mixture of pitch and a non-wettable organic material which is substantially immiscible with pitch and is a solid at ambient temperatures, the pitch to organic material ratio being between 25:1 and 7:1;

mixing the liquid mixture with gypsum and water to form a slurry having the correct water demand, the weight of liquid mixture being equal to from ten to twenty percent of the weight of hemi-hydrate gypsum on a dry weight basis;

forming the resultant slurry into the required shape; allowing the formed slurry to set; and heating the set slurry to a temperature high enough to melt both the pitch and the organic material but low enough to prevent deterioration of the set slurry.

Further according to the invention the organic material is a wax in the form of a micro or paraffin wax of the type the characteristics of which are listed below or is suitable fatty acid; the pitch is a pitch and heavy residue oil compound of the type described below; the proportion of pitch to wax is chosen to be between 10:1 and 16:1 and is preferably 15:1; and the amount of liquid mixture is preferably 15%.

Still further according to the invention the slurry is preferably formed into a board, cornice, tile or the like.

The invention further provides that where the product has a paper lining this lining be waterproofed by saturation with a high penetration bituminous compound.

Further according to the invention the compound is a cut-back bituminous compound.

An embodiment of the invention follows together with comparative tests and the results thereof.

In this embodiment a method of waterproofing gypsum products comprises the following steps:

(a) A liquid mixture of pitch compound and wax in the ratio 15:1 is made at a temperature of about 120° C. At this temperature a homogeneous liquid mixture is obtained. Two waxes, a paraffin and a microwax, have been found to be particularly suitable and are characterised as follows:

(i) Paraffin wax

Physical properties:
Latent heat of fusion 1,84 joules per gram
Specific heat
  solid    20° C. 1,93 joules per gram per degree Centigrade
  liquid  120° C. 2,40 joules per gram per degree Centigrade
          180° C. 2,48 joules per gram per degree Centigrade
          240° C. 2,63 joules per gram per degree Centigrade
  Viscosity at 100° C. 3,5 centipoise
  Requirements (Test Methods in Brackets)

| | Limits | (Typical) (Results) |
|---|---|---|
| Appearance - free from foreign material | | |
| Colour - white | | |
| Congealing Point (ASTM D938,IP76) ° C. | 57–60 | (58) |
| Oil Content - MEK solubility (—32° C.) (ASTM D721,IP158) mass % | 1,5 max | (1,4) |
| Anti-oxidant    mass % | ex-plant | (0,004) |
| Average molecular mass | | (400) |

(ii) Microwax

| Physical Properties: | |
|---|---|
| HI-MIC-1070 | |
| Melting Point (ASTM D127) | 77,2° C. |
| Oil Content (ASTM D721) | 1,5 weight percent |
| Needle penetration | |
| (ASTM D1321) at 20° C. | 20 |
| at 35° C. | 54 |
| at 45° C. | 125 |
| Colour (ASTM D1500) | 2,5 |
| Blocking Temp (ASTM D1465) | 1,6° C. |
| Viscosity (ASTM D445) | |
| at 98,8° C. | 8,2 centipoise |

The pitch used was a Pitch and Heavy Residue Oil (Flux) Compound having the following properties:

| Physical Properties: | |
|---|---|
| Ring and Ball Softening Point | 25 – 80° C., preferably about 50° C. |
| Viscosity at 15,5° C. | approximately 100 centipoise |
| Density at 20° C. | 1,224 |
| Maximum Phenolic Content of V/V | 1% |
| Insoluble Material in Carbon Disulphide maximum | 10,3% |

The ratio of the pitch to wax is 15:1.

(b) After mixing the liquid homogeneous pitch/wax mixture is fed in via a heated delivery system to a mixer into which is simultaneously introduced calcined gypsum and water to form a slurry having the correct water demand. The weight of liquid mixture added is equal to about 15% of the calcined hemi-hydrate gypsum on a dry weight basis.

(c) The slurry mixture formed is then moulded into the required shape in known manner. For example, if boards are being manufactured it is fed between paper liners and then shaped between rollers and the like.

(d) The shaped product is allowed to set for the required length of time during which the gypsum is converted from the hemi-hydrate ($2CaSo_4.\frac{1}{2}H_2O$) to the dihydrate ($2CaSo_4.2H_2O$).

(e) After setting the product is dried in a kiln. The drying temperature should be low enough not to result in recalcination of the gypsum and high enough to ensure softening or melting of both the pitch and the wax.

(f) The paper linings may then be made water resistant by dipping the product into a highly penetrating bituminous emulsion of the following characteristics:

Physical Properties:
1. Manufactured from an 80° C. softening point/100 Penetration grade bitumen.
2. Minimum Bitumen + Flux content 85%
   Basic Composition: Bitumen : 40%
   Flux : 45%
   Water and other organic material : 15%
3. Distillation Range up to 225° C.: 30 – 65% distilled
   up to 260° C.: 45 – 85% distilled
   up to 316° C.: 75 – 95% distilled
   up to 360° C.: 95 – 100% distilled Although the mechanism of the waterproofing action is not known for certain the inventors postulate the following mechanism which accounts for the experimental results hereinafter described.

During the drying stage the pitch/wax mixture is heated above the melting points of both constituents. The liquid mixture is thus able to flow in the capillaries inherent in the product and because of its initially dispersed condition does not offer much resistance to water migrating to the product surface.

As the product and hence the liquid mixture cools after the drying process the pitch and wax become less miscible. It is thought that the wax separates from the pitch and lines the capillaries in the product. This in turn ensures a negative capillary action with water and thus any outside moisture is prevented from entering the product via the capillaries. This separation probably does not take place to any great extent during the initial addition of the mixture to the slurry because of the high rate of cooling.

BRIEF DESCRIPTION OF THE DRAWINGS

FIG. 1 is a graph illustrating the results of water penetration tests where percent water absorption is plotted against time in hours, as reported in the following moisture penetration test A; and FIG. 2 is a graph illustrating the results of deterioration and water absorption test B in which water absorption in percent is plotted against time in hours for six samples.

A number of comparative tests were carried out on panels made as described above, both with and without waterproofed paper liners. These tests and their results are set out briefly below:

A. MOISTURE PENETRATION TEST

These tests were carried out on a normal panel having no waterproofing and on four other panels waterproofed in the manner described above using pitch/wax mixtures of different ratios. The panels had no paper liners and were 20 centimeters × 20 centimeters square and 1.27 centimeters thick. The description of the method is as follows:

A cylindrical cup 30 millimeters in diameter and 55 millimeters in height was pasted on to the panel surface with a rubber latex based adhesive. When the adhesive was completely dry the cup was filled with water. Percentage moisture contents in the panel were recorded at intervals as reflected in Table 1 and FIG. 1. The apparatus used to measure moisture contents was a Delmhorst Moisture Detector, model RC, G2. The principle of this meter is the measurement of electrical resistance which is related to the amount of water present in the specimen.

The results are shown in Table 1 from which it is apparent that 15% pitch and 1% wax is the correct ratio of the mixture required for optimum results, that is, after being continuously tested for 142 hours this panel showed a moisture increase of only 0.3% of the moisture content of a similar panel subjected to prevailing atmospheric humidities.

From the plot of the increase in percentage moisture against time as illustrated in the graph of FIG. 1 it is apparent that although the surface area of the panel is being subjected to continuous water contact the water resistant properties of the panel improve with time. It is also clear that fairly satisfactory results are obtained using ratios of 10:1 and that ratios of less than 10:1 result in a deterioration of water resistant properties in the last stages of the tests. For ratios of less than 7:1 rapid deterioration commences in the initial stages of testing.

B. DETERIORATION AND WATER ABSORPTION TEST

This test was carried out by submerging a 50 centimeter × 50 centimeter piece of the gypsum panel treated with the mixing having a pitch to wax ratio of 15:1 under 25 millimeters of water. Similar sized pieces of bituminous based damp course and water resistant bituminous-treated paper felt were used as reference standards as they both have a recognised waterproofing rating. The samples were held under water by a stainless steel wire cage. The amount of water absorbed was recorded by weight difference at intervals after removal of excess moisture on the surface of the samples using blotting paper. All samples were treated identically.

From results reflected on the graph of FIG. 2 is it apparent that the water resistant gypsum panel absorbed less water than either the bituminous based damp course or the bituminous treated paper felt.

Observations with respect to Deterioration:
1. The water resistant panel showed very slight signs of powdering after being submerged for 50 hours under water, however it was otherwise sound and intact.
2. The water resistant damp course and the paper felt showed signs of softening and a definite reduction in strength.
3. In general the water resistant gypsum panel compared very favourably with both the bituminous treated damp course and bituminous treated water resistant paper felt.

Test samples submitted to the South African Bureau of Standards and tested according to test method SABS 540-1971 "Wood Fibre Building Board" only show an average increase in weight of 0.53% after 24 hours total immersion. These samples were approximately two months old when tested which confirms the fact that the material improves with time. With respect to the water absorption tests the results of which are reflective in FIG. 2 it should be noted that they were carried out on newly manufactured material.

C. TEST TO DETERMINE WEATHER RESISTANCE

The following two tests were carried out:

(a) Simulated Extreme Changes of Weather Conditions

A 20 centimeter × 20 centimeter sample of the gypsum panel treated with a mixture of pitch and wax in the ratio 15:1 and an untreated panel were subject to the following extremities:

The samples were submerged in water at 20° C. for approximately 12 hours daily and then placed in an oven at 40° C. for the next 12 hours. This procedure was repeated 14 times.

Result: This heating-wetting cooling-reheating process seemed to make the treated panel harder and more resistant to the changes, while the untreated panel softened and disintegrated after the third repetition.

(b) Samples submitted to Normal Weather Conditions

Similar control samples were used as in (a) above and were placed in the open for seven days during which fairly heavy rains were experienced five times and atmospheric temperatures varied from 15° C. to 29° C. The results were similar to those obtained in (a) above.

D. COMPARISON OF COMPRESSIVE STRENGTHS

A final product comprising a water resistant panel covered with water resistant paper liners was found to be approximately 50% stronger than the conventional untreated gypsum product having the same thickness.

The good waterproofing properties obtained in gypsum products manufactured according to this invention are evident from the above tests. Other benefits were, however, noted.

Firstly, the addition of the pitch and wax mixture increased the setting rate of the gypsum slurry on laboratory samples but had no obvious effect in production scale use. Certainly no deleterious effects were noticed. Tests have shown that the use of bitumin emulsions tend to decrease the setting rate.

Secondly, in comparison with untreated products, products made from treated slurry are shown to have improved strength characteristics. This would enable an inferior and hence less expensive paper liner to be used in production.

Thirdly, from the test results the good characteristics of the products appear to improve with time.

It has also now been established by the South African Bureau of Standards that the product has a fire proof rating at least as good as that of a conventional gypsum product and a certificate has been granted to this effect.

Other embodiments are envisaged within the scope of the invention including the use of mixtures of other ratios, the application of the invention to other gypsum products and the use of other suitable organic materials in the pitch mixture.

is substantially immiscible with pitch and is a solid, the pitch to organic material ratio being between 25:1 and 7:1;

B. mixing the liquid mixture formed in Step A with gypsum and water to form a slurry having the correct water demand, the weight of liquid mixture being equal to from ten to twenty percent of the weight of hemi-hydrate gypsum on a dry weight basis;

C. forming the resultant slurry into a predetermined shape;

D. allowing the formed slurry to set; and

E. heating the thus set slurry to a temperature high enough to melt both the pitch and the organic material but low enough to prevent deterioration of the set slurry.

2. A method as claimed in claim 1 in which the pitch to organic material ratio is in a range defined by the ratios 16:1 and 10:1.

3. A method as claimed in claim 1 in which the pitch to organic material ratio is about 15:1.

4. A method as claimed in claim 1 in which the weight of liquid mixture is about fifteen percent of the weight of hemi-hydrate gypsum on a dry weight basis.

5. A method as claimed in claim 1 in which the temperature of the liquid mixture is at least 120° C. on forming the slurry.

6. A method as claimed in claim 1 in which the pitch is a pitch and heavy residue oil compound.

7. A method as claimed in claim 1 in which the organic material is a wax.

8. A method as claimed in claim 7 in which the wax is a paraffin wax having a latent heat of fusion of 1.84 joules per gram, a viscosity at 100° C. of 3.5 centipoise and an average molecular mass of about 400.

9. A method as claimed in claim 7 in which the wax is a microwax having a melting point of about 77.2° C., an oil content of about 1.5 weight percent and a viscosity at 98.8° C. of about 8.2 centipoise.

10. A method as claimed in claim 1 in which the slurry is formed in a paper lining waterproofed by saturation with a highly penetrating bituminous compound.

11. A method as claimed in claim 10 in which the compound is a cut-back bituminous compound.

12. A product made in accordance with the method claimed in claim 1.

13. A method of manufacturing a substantially waterproof shaped gypsum product, said method including the successive steps of:

(1) mixing together at an elevated temperature pitch

TABLE 1

| Pitch to wax ratio of mixture in panel | At start | | After 4 hours | | After 72 hours | | After 80 hours | | After 96 hours | | After 130 hours | | After 142 hours | |
|---|---|---|---|---|---|---|---|---|---|---|---|---|---|---|
| | W | D | W | D | W | D | W | D | W | D | W | D | W | D |
| No mixture added | 13,5 | 13,5 | 30,0+ | 13,0 | 30,0+ | 13,7 | 30,0+ | 13,5 | 30,0+ | 14,0 | 30,0+ | 13,5 | 30,0+ | 14,5 |
| 5:1 | 9,0 | 9,0 | 10,5 | 8,0 | 30,0+ | 8,0 | 30,0+ | 9,0 | 30,0+ | 10,0 | 30,0+ | 8,2 | 30,0+ | 10,7 |
| 7:1 | 10,0 | 10,0 | 10,5 | 9,0 | 12,5 | 10,1 | 12,0 | 9,5 | 13,0 | 10,0 | 15,0 | 9,5 | 30,0+ | 10,7 |
| 10:1 | 9,5 | 9,5 | 10,0 | 8,5 | 12,0 | 10,0 | 11,5 | 9,2 | 12,0 | 10,0 | 11,2 | 9,2 | 12,8 | 10,7 |
| 15:1 | 9,5 | 9,5 | 9,5 | 8,5 | 11,0 | 9,4 | 11,0 | 9,0 | 11,0 | 10,0 | 10,3 | 9,0 | 11,0 | 10,7 |

WHERE: W represents underlying area of sample being subjected continuously to 55 millimetre water-guage on surface.
and D represents the remainder of sample being subjected to the surrounding atmosphere at prevailing humidity conditions.

What we claim as new and desire to secure by Letters Patent is:

1. A method of making gypsum products comprising the steps of:

A. making at elevated temperatures a homogeneous liquid mixture of pitch and non-wettable organic material which material, at ambient temperatures, and a non-wettable organic material selected from the group consisting of micro wax, paraffin wax, fatty acids and mixtures thereof, the organic material selected being substantially unmiscible with pitch and solid at ambient temperatures, the pitch to organic material ratio being between 25:1 and 7:1, to form a homogeneous liquid mixture;

(2) mixing the heated liquid mixture formed in step (1) with gypsum and water thereby forming a slurry having a predetermined water demand, the weight of liquid mixture from step (1) used to form said slurry being equal to from 10 to 20 percent of the weight of hemi-hydrate gypsum on a dry weight basis;

(3) forming the slurry of step (2) into a predetermined shape;

(4) allowing the thus formed slurry to set; and (5) heating the set slurry from step (4) to a temperature sufficient to melt both the pitch and the organic material without deterioration of the set slurry; thereby forming a shaped gypsum product which is substantially waterproof.

14. A method as claimed in claim 13 wherein the ratio of pitch to organic material is about 15:1, the weight of liquid mixture from step (1) used in step (2) is about 15 percent and the liquid mixture is added at a temperature of about 120° C.

* * * * *